US010375296B2

(12) United States Patent
Wang et al.

(10) Patent No.: US 10,375,296 B2
(45) Date of Patent: Aug. 6, 2019

(54) METHODS APPARATUSES, AND STORAGE MEDIUMS FOR ADJUSTING CAMERA SHOOTING ANGLE

(71) Applicant: XIAOMI INC., Haidian District, Beijing (CN)

(72) Inventors: Yang Wang, Beijing (CN); Qiang Fu, Beijing (CN); Enxing Hou, Beijing (CN)

(73) Assignee: XIAOMI INC., Beijing (CN)

( * ) Notice: Subject to any disclaimer, the term of this patent is extended or adjusted under 35 U.S.C. 154(b) by 89 days.

(21) Appl. No.: 15/360,372

(22) Filed: Nov. 23, 2016

(65) Prior Publication Data

US 2017/0155829 A1   Jun. 1, 2017

(30) Foreign Application Priority Data

Nov. 27, 2015   (CN) .......................... 2015 1 0849310

(51) Int. Cl.
*G06K 9/00* (2006.01)
*H04N 5/33* (2006.01)
(Continued)

(52) U.S. Cl.
CPC ..... *H04N 5/23219* (2013.01); *G06K 9/00255* (2013.01); *G06K 9/00315* (2013.01);
(Continued)

(58) Field of Classification Search
CPC ........... H04N 5/23219; H04N 5/23216; H04N 5/23296; H04N 5/332; G06K 9/00255; G06K 9/00315; G10L 25/57
See application file for complete search history.

(56) References Cited

U.S. PATENT DOCUMENTS 5,774,591 A    6/1998  Black
6,606,458 B2 * 8/2003  Umeda .................. G03B 13/18
                                                  348/143
(Continued)

FOREIGN PATENT DOCUMENTS

CN    102594990 A    7/2012
CN    102833476 A    12/2012
(Continued)

OTHER PUBLICATIONS

First Office Action issued in corresponding Chinese Application No. 201510849310.5 dated Dec. 6, 2017, 14 pages.
(Continued)

*Primary Examiner* — Huy T Nguyen
(74) *Attorney, Agent, or Firm* — Arch & Lake LLP

(57) ABSTRACT

A method, an apparatus, and a storage medium are provided for adjusting camera shooting angle. The method includes: determining a position of a human body in a shooting range of a camera; adjusting a shooting angle of the camera based on the position of the human body, such that an image of the human body is located at the center of a video picture shot by the camera; determining a position of a human face in the video picture shot by the camera; and fine-adjusting the shooting angle of the camera based on the position of the human face, such that an image of the human face is located at the center of the video picture shot by the camera.

15 Claims, 8 Drawing Sheets

(51) Int. Cl.
*G10L 25/57* (2013.01)
*H04N 5/232* (2006.01)

(52) U.S. Cl.
CPC ......... *G10L 25/57* (2013.01); *H04N 5/23216* (2013.01); *H04N 5/23296* (2013.01); *H04N 5/332* (2013.01)

(56) References Cited

U.S. PATENT DOCUMENTS

| | | | |
|---|---|---|---|
| 6,850,265 B1* | 2/2005 | Strubbe | H04N 7/183 |
| | | | 348/14.05 |
| 2001/0055059 A1 | 12/2001 | Satoda | |
| 2002/0041324 A1* | 4/2002 | Satoda | H04N 7/15 |
| | | | 348/14.05 |
| 2003/0123754 A1 | 7/2003 | Toyama | |
| 2004/0202353 A1* | 10/2004 | Doi | G06K 9/00604 |
| | | | 382/115 |
| 2006/0075448 A1 | 4/2006 | McAlpine | |
| 2007/0040903 A1 | 2/2007 | Kawaguchi | |
| 2007/0172230 A1 | 7/2007 | Wernersson | |
| 2008/0267459 A1* | 10/2008 | Nakada | G09B 19/00 |
| | | | 382/118 |
| 2009/0015658 A1 | 1/2009 | Enstad | |
| 2010/0173678 A1 | 7/2010 | Kim et al. | |
| 2011/0090303 A1 | 4/2011 | Wu | |
| 2012/0098992 A1 | 4/2012 | Hosoe | |
| 2013/0063581 A1* | 3/2013 | Komatsu | G06K 9/00288 |
| | | | 348/77 |
| 2013/0235086 A1 | 9/2013 | Otake | |
| 2014/0176430 A1 | 6/2014 | Guo | |
| 2014/0247374 A1 | 9/2014 | Murakami et al. | |
| 2015/0124155 A1 | 5/2015 | Li | |
| 2015/0146078 A1 | 5/2015 | Aarrestad et al. | |

FOREIGN PATENT DOCUMENTS

| | | | |
|---|---|---|---|
| CN | 203301636 U | | 11/2013 |
| CN | 103475849 A | | 12/2013 |
| CN | 103841357 A | | 6/2014 |
| CN | 104580992 A | | 4/2015 |
| CN | 104992169 A | | 10/2015 |
| CN | 105357442 A | | 2/2016 |
| EP | 2207342 A2 | | 7/2010 |
| EP | 2547089 A1 | | 1/2013 |
| EP | 2816404 A1 | | 12/2014 |
| JP | H06276514 A | | 9/1994 |
| JP | H1141577 A | | 2/1999 |
| JP | 2003259190 | | 9/2003 |
| JP | 2003532348 A | | 10/2003 |
| JP | 2004219277 | | 8/2004 |
| JP | 2005150834 | | 6/2005 |
| JP | 2005208454 A | | 8/2005 |
| JP | 2006311196 | | 11/2006 |
| JP | 2009026146 | | 2/2009 |
| JP | 2014033265 A | | 2/2014 |
| JP | 2014168126 A | | 9/2014 |
| KR | 20090025647 | | 3/2009 |
| KR | 20130000660 | | 1/2013 |
| RU | 2417545 C2 | | 2/2010 |
| WO | 2013052383 A1 | | 4/2013 |
| WO | 2013118450 A1 | | 8/2013 |

OTHER PUBLICATIONS

First Office Action issued in corresponding Japanese Application No. 2016-562261 dated Feb. 6, 2018, 7 pages.
International Search Report issued in corresponding PCT Application No. PCT/CN2016/082692, dated Aug. 23, 2016, 12 pages.
Extended European Search Report issued in corresponding EP Application No. 16200355, dated Apr. 18, 2017, 8 pages.
Russian First Office Action issued in corresponding RU Application No. 2016142694 dated May 31, 2018, 7 pages.
International Preliminary Report on Patentability (including English translation) dated May 29, 2018 for International Application No. PCT/CN2016/082692, 10 pages.
Notification of Reason for Refusal (including English translation) issued in corresponding Korean Application No. 10-2016-7027675 dated Sep. 3, 2018, 10 pages.
First Office Action issued in corresponding Korean Patent Application No. 10-2016-7027675 dated Mar. 19, 2018, 5 pages.

* cited by examiner

METHODS APPARATUSES, AND STORAGE MEDIUMS FOR ADJUSTING CAMERA SHOOTING ANGLE

CROSS-REFERENCE TO RELATED APPLICATION

This application is based on and claims the priority of the Chinese patent application No. 201510849310.5, filed on Nov. 27, 2015, which is incorporated herein by reference in its entirety.

TECHNICAL FIELD

The present disclosure is related to the field of smart homes, and more particularly, to a camera shooting angle adjusting method and apparatus, and a storage medium.

BACKGROUND

With popularization of smart devices and rapid development of network technologies, smart camera is becoming more and more popular in people's life and is widely used in such scenes as security, automatic control and remote video interaction.

In the related arts, shooting angle of smart camera is fixed during using. When users want to adjust the shooting angle of smart camera, they may manually adjust the same using control devices of the smart cameras.

SUMMARY

According to a first aspect of embodiments of the present disclosure, there is provided a camera shooting angle adjusting method, including: determining a position of a human body in a shooting range of a camera; adjusting a shooting angle of the camera based on the position of the human body, such that an image of the human body is located at the center of a video picture shot by the camera; determining a position of a human face in the video picture shot by the camera; and fine-adjusting the shooting angle of the camera based on the position of the human face, such that an image of the human face is located at the center of the video picture shot by the camera.

According to a second aspect of embodiments of the present disclosure, there is provided a camera shooting angle adjusting apparatus, including: a first positioning module configured to determine a position of a human body in a shooting range of a camera; a first adjusting module configured to adjust a shooting angle of the camera based on the position of the human body determined by the first positioning module, such that an image of the human body is located at the center of a video picture shot by the camera; a second positioning module configured to determine a position of a human face in the video picture shot by the camera; and a second adjusting module configured to fine-adjust the shooting angle of the camera based on the position of the human face determined by the second positioning module, such that an image of the human face is located at the center of the video picture shot by the camera.

According to a third aspect of embodiments of the present disclosure, there is provided a camera shooting angle adjusting apparatus, including a processor and a memory configured to store instructions executable by the processor. The processor is configured to: determine a position of a human body in a shooting range of a camera; adjust a shooting angle of the camera based on the position of the human body, such that an image of the human body is located at the center of a video picture shot by the camera; determine a position of a human face in the video picture shot by the camera; and fine-adjust the shooting angle of the camera based on the position of the human face, such that an image of the human face is located at the center of the video picture shot by the camera.

According to a fourth aspect of embodiments of the present disclosure, there is provided a non-transitory computer-readable storage medium having stored therein instructions that, when executed by a processor of a mobile terminal, causes the mobile terminal to perform acts including: determining a position of a human body in a shooting range of a camera; adjusting a shooting angle of the camera based on the position of the human body, such that an image of the human body is located at the center of a video picture shot by the camera; determining a position of a human face in the video picture shot by the camera; and fine-adjusting the shooting angle of the camera based on the position of the human face, such that an image of the human face is located at the center of the video picture shot by the camera.

It should be understood that both the foregoing general description and the following detailed description are only exemplary and explanatory and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
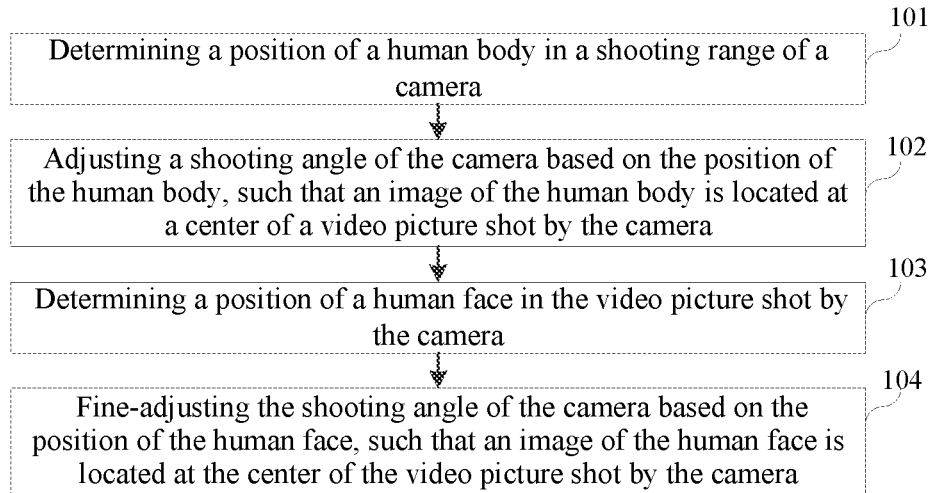
FIG. 1 is a flow chart showing a camera shooting angle adjusting method according to an exemplary embodiment.

FIG. 1 is a flow chart showing a camera shooting angle adjusting method according to an exemplary embodiment. The method is used in a camera. As shown in FIG. 1, the method may include the steps as follows.

In step 101, a position of a human body in a shooting range of a camera is determined.

In step 102, a shooting angle of the camera is adjusted based on the position of the human body, such that an image of the human body is located at the center of a video picture shot by the camera. For example, the camera may adjust the shooting angle and other shooting parameters so that the image of the human body is located at the center region of the video picture. The center region may be defined by a user in camera settings and the default center region may occupy the middle ⅓ of the whole image area of the video picture. The camera may adopt s standard adjusting step such as 0.5° during fine adjusting.

In step 103, a position of a human face in the video picture shot by the camera is determined.

In step 104, the shooting angle of the camera is fine-adjusted based on the position of the human face, such that an image of the human face is located at the center of the video picture shot by the camera. For example, the camera may fine-adjust the shooting angle of the camera within a preset range that is less than the first range that is used during the adjusting in step 102. The first range may include a range between −10° and 10° while the second range may include a range between −2° and 2°. The camera may adopt s fine adjusting step such as 0.1° during fine adjusting. Additionally or alternatively, the camera may fine-adjust the shooting angle of the camera using a second motor while the camera adjust the shooting angle of the camera in step 102 using a first motor.

Alternatively or additionally, said determining the position of the human body in the shooting range of the camera includes: collecting a sound signal sent from a sound source in the shooting range of the camera; detecting whether a frequency band of the sound signal is within a preset frequency band; and determining a position of the sound source as the position of the human body when the frequency band of the sound signal is within the preset frequency band.

Alternatively or additionally, said determining the position of the human body in the shooting range of the camera includes: collecting an infrared signal sent by an infrared signal source in the shooting range of the camera; detecting whether the spectrum feature of the infrared signal matches a preset spectrum; and determining a position of the infrared signal source as the position of the human body, when the spectrum feature of the infrared signal matches the preset spectrum.

Alternatively or additionally, said determining the position of the human face in the video picture shot by the camera includes: recognizing a facial expression of at least one human face in the video picture shot by the camera; and determining a position of a human face, whose facial expression matches a designated facial expression, in the video picture as the position of the human face.

Alternatively or additionally, said determining the position of the human face in the video picture shot by the camera includes: pushing the video picture to a user terminal connected to the camera; receiving selection instruction information returned by the user terminal, the selection instruction information indicating a human face included in the video picture; and determining a position of the human face indicated by the selection instruction information in the video picture as the position of the human face.

Alternatively or additionally, the method further includes: after fine-adjusting the shooting angle of the camera based on the position of the human face, detecting a distance by which the image of the human face deviates from the center of the video picture shot by the camera; when detecting that the distance by which the image of the human face deviates from the center of the video picture is greater than a preset distance, fine-adjusting the shooting angle of the camera based on the position of the image of the human face once again, such that the image of the human face is located at the center of the video picture shot by the camera.

To sum up, in the camera shooting angle adjusting method according to the embodiment of the disclosure, a position of a human body in a shooting range of a camera is determined, a shooting angle of the camera is adjusted so that the camera targets the position of the human body, and then the camera is fine-adjusted based on a position of a human face. As such, the shooting angle of the camera is automatically fine-adjusted based on the position of the human face, without the need for users to manually adjust the shooting angle of the camera, thereby reducing the complexity of users' operations and improving the accuracy of adjusting the shooting angle.

Figure 2A:
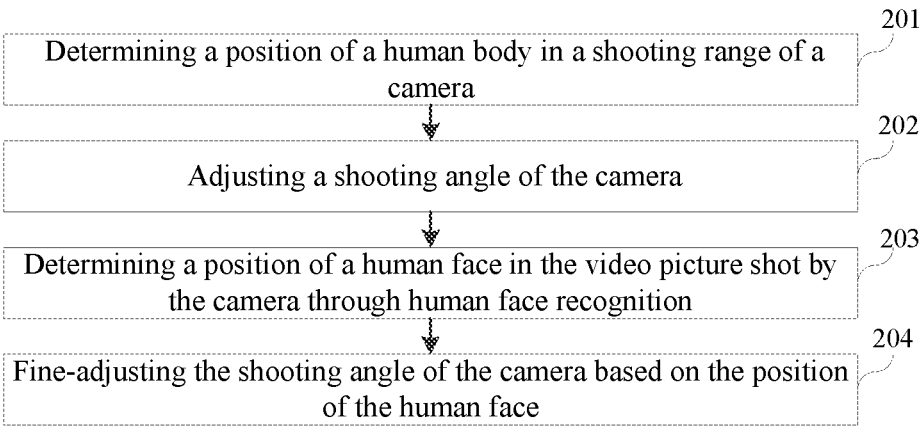
FIG. 2A is a flow chart showing a camera shooting angle adjusting method according to another exemplary embodiment.

FIG. 2A is a flow chart showing a camera shooting angle adjusting method according to another exemplary embodiment. The method is used in a camera. As shown in FIG. 2A, the method may include the steps as follows.

In step 201, a position of a human body in a shooting range of a camera is determined.

Figure 2B:
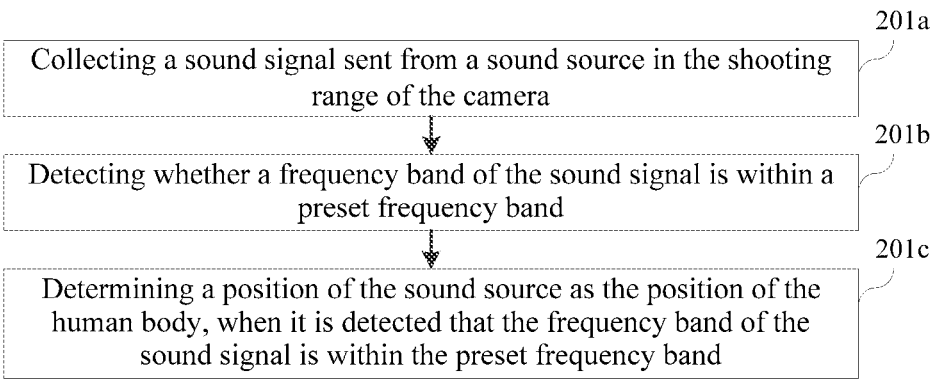
FIG. 2B is a flow chart showing a process of determining a position of a human body in a shooting range of a camera according to an exemplary embodiment.

In a possible implementation, referring to FIG. 2B which is a flow chart showing a process of determining a position of a human body in a shooting range of a camera according to an exemplary embodiment, the method may include the following steps.

In step 201a, a sound signal sent from a sound source in the shooting range of the camera is collected.

In step 201b, whether a frequency band of the sound signal is within a preset frequency band is detected.

In step 201c, a position of the sound source is determined as the position of the human body, when the frequency band of the sound signal is within the preset frequency band.

The camera can determine a position of a human body based on a sound signal sent from a sound source in a shooting range of the camera. For example, the camera has a sound signal collecting device mounted therein. The sound signal collecting device collects sound signals from the sound source in a preset period of time and takes an average value of the sound signals collected in the preset period of time. For example, the camera may calculate a short term energy of the sound signals for each frame during the preset period of time. The preset period of time is not restricted, and may be set as 30 seconds or 1 minute. When the average value of the sound signals includes a spectrum signal within a preset frequency band, the camera may determine that the position of the sound source is the position of the human body by using the short term energy and other analysis. For example, as the position of the human body is to be determined, the preset frequency band may be a frequency band in which people normally talk. For example, the frequency band in which people normally talk is 130-350 Hz.

Figure 2C:
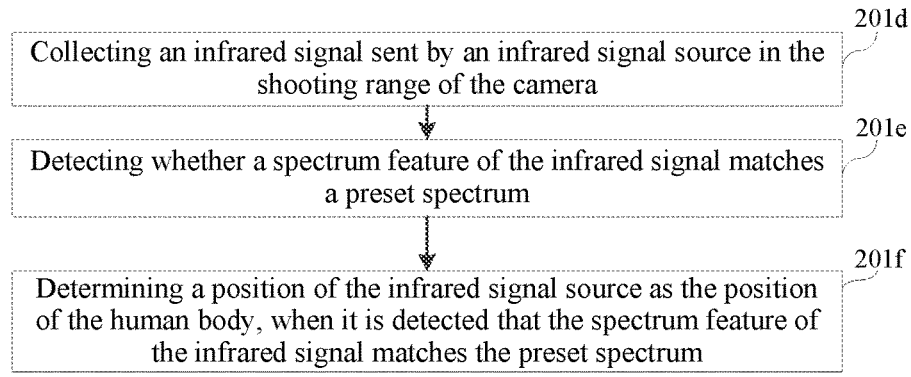
FIG. 2C is a flow chart showing a process of determining a position of a human body in a shooting range of a camera according to another exemplary embodiment.

In another possible implementation, referring to FIG. 2C which is a flow chart showing a process of determining a position of a human body in a shooting range of a camera according to another exemplary embodiment, the method may include the following steps implemented by a smart camera.

In step 201d, an infrared signal sent by an infrared signal source in the shooting range of the camera is collected.

In step 201e, whether the spectrum feature of the infrared signal matches a preset spectrum is detected.

In step 201f, a position of the infrared signal source is determined as the position of the human body, when the spectrum feature of the infrared signal matches the preset spectrum.

In addition to or instead of determining a position of a human body based on sound signals sent from a sound source in a shooting range of the camera, the camera may also determine a position of a human body based on the spectrum feature of an infrared signal. The spectrum feature of the infrared signal may include among others a frequency of the infrared signal and a wavelength thereof. Infrared signals sent by different objects have different spectrum features. In a possible implementation of the embodiment, the spectrum feature of a human body may be set as a preset spectrum. When the spectrum feature of infrared signals sent by an object matches the preset spectrum, the object can be determined as a human body.

In step 202, a shooting angle of the camera is adjusted.

The shooting angle of the camera is adjusted such that an image of the human body is located at the center of a video picture shot by the camera.

For example, a micro electric motor is provided within the camera. After the camera determines the position of the human body, the micro electric motor within the camera starts to work to adjust the shooting angle of the camera such that an image of the human body is located at the center of a video picture shot by the camera.

In step 203, a position of a human face in the video picture shot by the camera is determined by performing human face recognition.

After determining the position of the human body, to obtain better shooting effect, a position of a human face in the video picture shot by the camera is determined by the camera through human face recognition. For example, the camera determines a position of a human face based on facial features of the human body in the video picture, such as the ears, eyes, mouth and nose, shapes of the facial features and their geometrical relations.

In step 204, the shooting angle of the camera is fine-adjusted based on the position of the human face.

When there is only one human face in the video picture shot by the camera, the shooting angle of the camera may be fine-adjusted such that an image of the human face is located at the center of the video picture shot by the camera.

Alternatively or additionally, when there are multiple human faces in the video picture shot by the camera, the position of one of the human faces may be determined, and the fine-adjustment may be performed subsequently based on the determined position of the human face. When there are multiple human faces in the video picture shot by the camera, the method of determining the position of one of the human faces may be as below.

Figure 2D:
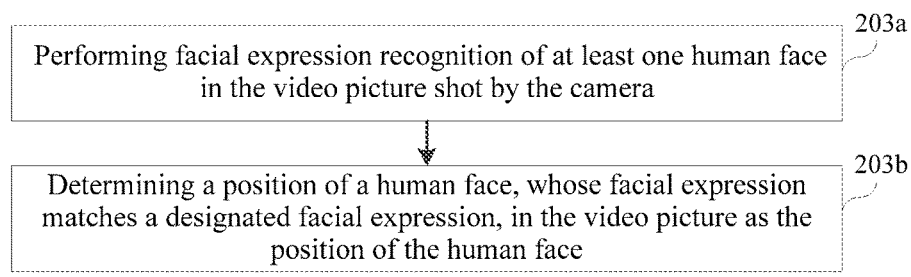
FIG. 2D is a flow chart showing a process of determining a position of a human face according to an exemplary embodiment.

In a possible implementation, referring to FIG. 2D which is a flow chart showing a process of determining a position of a human face according to an exemplary embodiment, the method may include the following steps.

In step 203a, facial expression recognition is performed of at least one human face in the video picture shot by the camera.

In step 203b, a position of a human face, whose facial expression matches a designated facial expression, in the video picture is determined as the position of the human face.

Figure 2E:
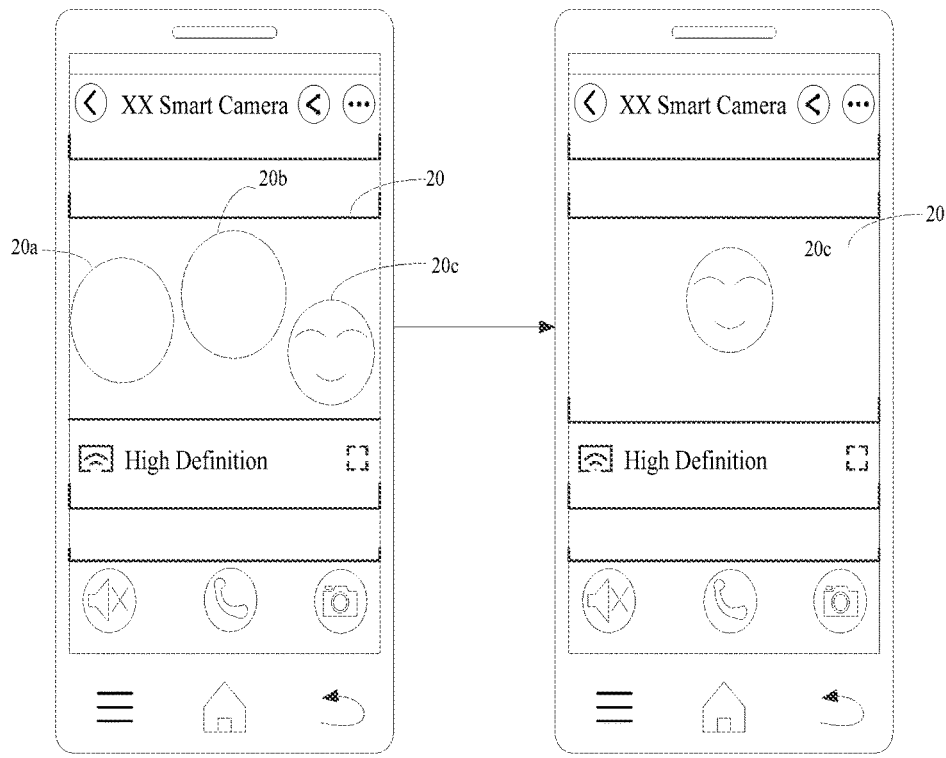
FIG. 2E is a schematic diagram showing how to adjust a shooting angle of a camera according to an exemplary embodiment.

When there are multiple human faces in the video picture shot by the camera, the human face to be shot by the camera may be determined through facial expression recognition. For example, a smiling facial expression is preset as a designated facial expression. When there are multiple human faces in the video picture shot by the camera and one human face has a smiling facial expression, the shooting angle of the camera is fine-adjusted such that the human face having the smiling facial expression is located at the center of a video picture shot by the camera. FIG. 2E is a schematic diagram showing how to adjust a shooting angle of a camera according to an exemplary embodiment. The video picture 20 shown in FIG. 2E includes three human faces 20a, 20b and 20c. The camera detects that one human face 20c has a smiling facial expression. Then, the shooting angle of the camera is fine-adjusted such that the human face 20c having a smiling facial expression is located at the center of the video picture.

Figure 2F:
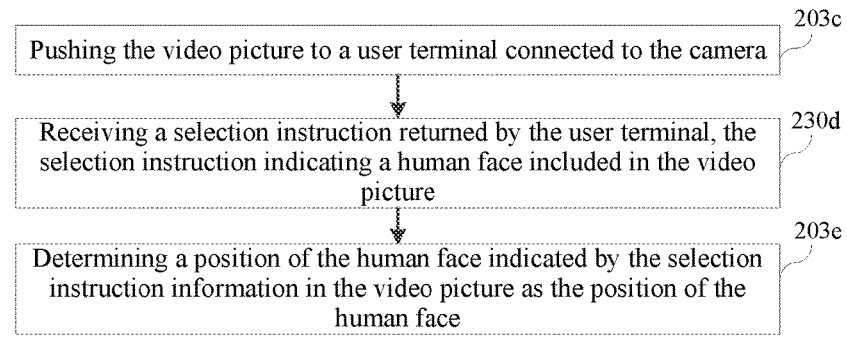
FIG. 2F is a flow chart showing a process of determining a position of a human face according to another exemplary embodiment.

In another possible implementation, referring to FIG. 2F which is a flow chart showing a process of determining a position of a human face according to another exemplary embodiment, the method may include the following steps.

In step 203c, the video picture is pushed to a user terminal connected to the camera.

In step 203d, selection instruction information returned by the user terminal is received, the selection instruction information indicating a human face included in the video picture.

In step 203e, a position of the human face indicated by the selection instruction information in the video picture is determined as the position of the human face.

Figure 2G:
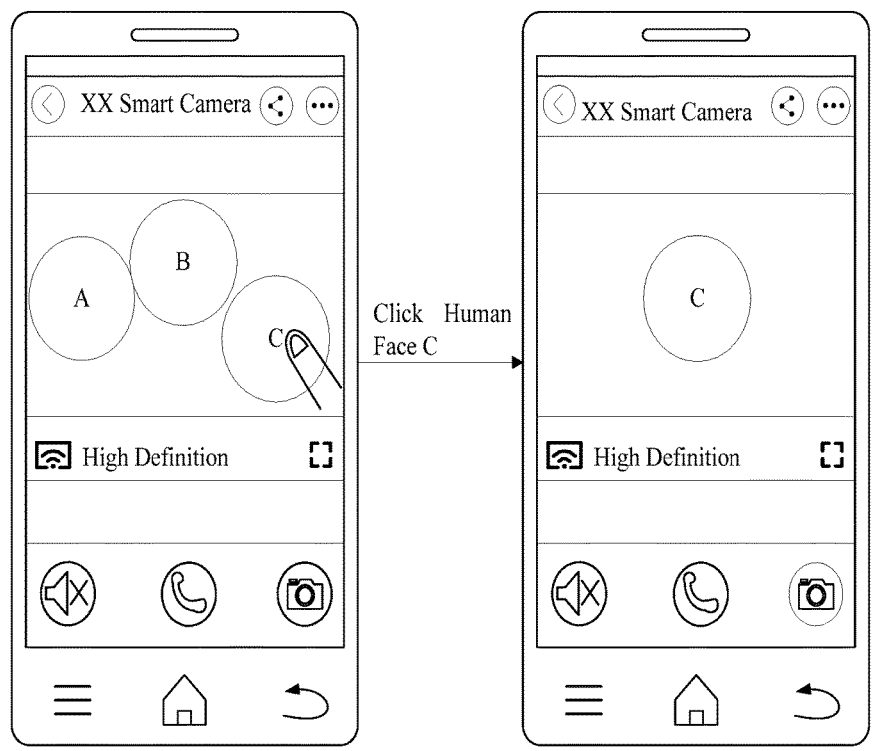
FIG. 2G is a schematic diagram showing how to adjust a shooting angle of a camera according to another exemplary embodiment.

Alternatively or additionally, when there are multiple human faces in the video picture shot by the camera, the camera may push the shot video picture to a user terminal connected thereto. The user may select a human face to be shot. When receiving selection instruction information returned by the user terminal, the camera determines a position of the human face indicated by the selection instruction information in the video picture as the position of the human face. FIG. 2G is a schematic diagram showing how to adjust a shooting angle of a camera according to another exemplary embodiment. The video picture shown in FIG. 2G is one transmitted by the camera to the user terminal and displayed in the user terminal. The video picture includes three human faces A, B and C. When the user clicks a region where the human face C is located, the user terminal sends coordinate information of the human face C to the camera. After receiving the coordinate information, the camera determines that the user has selected the human face C based on the coordinate information. Then, the shooting angle of the camera is fine-adjusted such that an image of the human face C is located at the center of the video picture.

To sum up, in the camera shooting angle adjusting method according to the embodiment of the disclosure, a position of a human body in a shooting range of a camera is determined, a shooting angle of the camera is adjusted so that the camera targets the position of the human body, and then the camera is fine-adjusted based on a position of a human face. As such, the shooting angle of the camera is automatically fine-adjusted based on the position of the human face, without the need for users to manually adjust the shooting angle of the camera, thereby reducing the complexity of users' operations and improving the accuracy of adjusting the shooting angle.

In the disclosure, by using a sound source or infrared signal detecting method, a sound signal or an infrared signal sent by a human body in a shooting range is collected, and a position of the human body in the shooting range can be determined based on a preset frequency band or time-frequency spectrum, so that the human body in the shooting range can be tracked accurately and effectively. Accordingly, a shooting angle of a camera can be adjusted to adapt to the position of the human body, and it can be avoided that the position of an animal or object other than a human body is determined as the position of the human body.

Here, by recognizing a facial expression in the shooting range, a human face to be shot by the camera can be determined. Alternatively, the camera pushes a shot video picture to a user terminal connected to the camera; and by receiving the user terminal's selection instruction information, a human face to be shot can be determined. Accordingly, a shooting angle can be fine-adjusted. As such, it is convenient, when there are multiple human faces in the shooting range, to adjust the shooting angle of the camera based on the user's needs, so that the human face to be shot can be displayed at the center of the video picture.

Figure 3A:
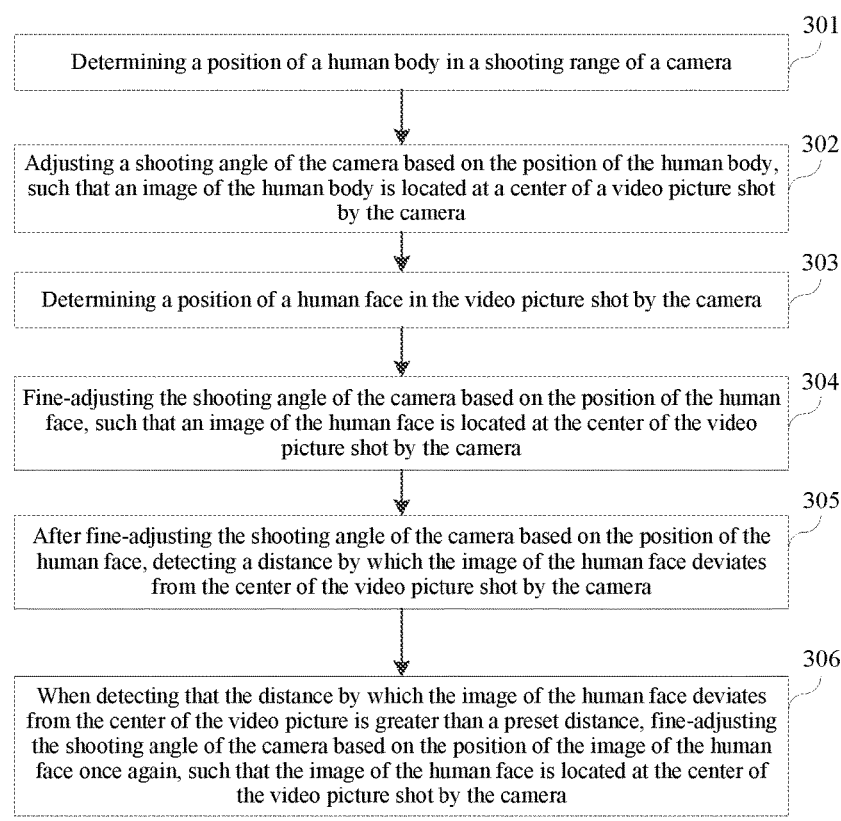
FIG. 3A is a flow chart showing a camera shooting angle adjusting method according to yet another exemplary embodiment.

FIG. 3A is a flow chart showing a camera shooting angle adjusting method according to yet another exemplary embodiment. The method is used in a camera. As shown in FIG. 3A, the method may include the steps as follows.

In step 301, a position of a human body in a shooting range of a camera is determined.

In step 302, a shooting angle of the camera is adjusted.

In step 303, a position of a human face in the video picture shot by the camera is determined through human face recognition.

In step 304, the shooting angle of the camera is fine-adjusted based on the position of the human face.

For the implementation of steps 301-304, reference can be made to the description of steps 201-204 in the embodiment shown in FIG. 2, and the description thereof will not be repeated here.

In step 305, after the shooting angle of the camera is fine-adjusted based on the position of the human face, a distance by which the image of the human face deviates from the center of the video picture shot by the camera is detected.

Figure 3B:
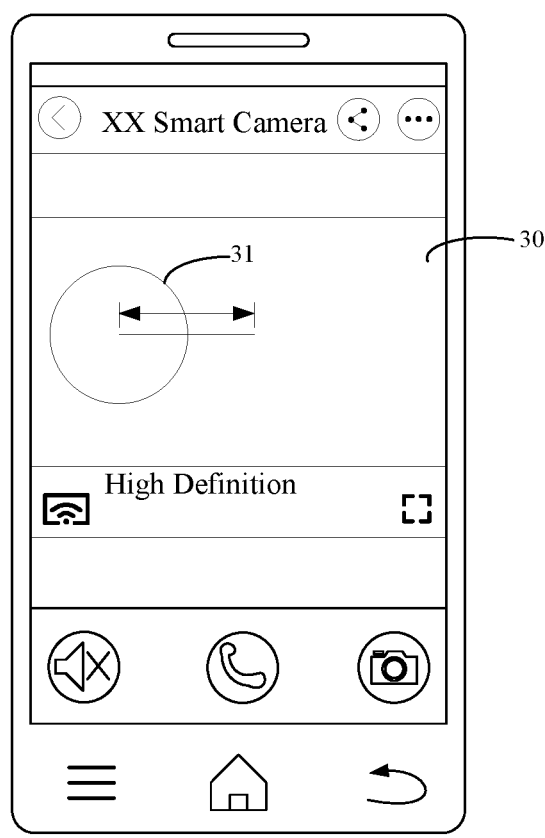
FIG. 3B is a schematic diagram showing how to detect a deviation distance of a human face according to an exemplary embodiment.

As the position of the human face is changing in the video shooting process, the camera detects a distance by which the image of the human face deviates from the center of the video picture shot by the camera, in order to prevent the position of the human face from exceeding the shooting range of the camera so as to ensure better shooting effect. Refer to FIG. 3B, which is a schematic diagram showing how to detect a deviation distance of a human face. The center of the video picture 30 shot by the camera in FIG. 3B is taken as the starting point. A distance from the center of the video picture 30 to the center of the image 31 of the human face is calculated. The distance from the center of the video picture 30 to the center of the image 31 of the human face is taken as the distance by which the image of the human face deviates from the center of the video picture shot by the camera.

In step 306, when detecting that the distance by which the image of the human face deviates from the center of the video picture is greater than a preset distance, the shooting angle of the camera is fine-adjusted based on the position of the image of the human face once again, such that the image of the human face is located at the center of the video picture shot by the camera.

The camera may designate the center of the video picture shot by the camera as the center of a circle and designate a preset distance as its radius. When it is detected that the distance from the center of the video picture to the center of the image the human face is greater than the preset distance (for example, the center of the image of the human face is located outside the circle having the center of the video picture as its center and having the preset distance as its radius), the shooting angle of the camera is fine-adjusted based on the position of the image of the human face once again.

Figure 3C:
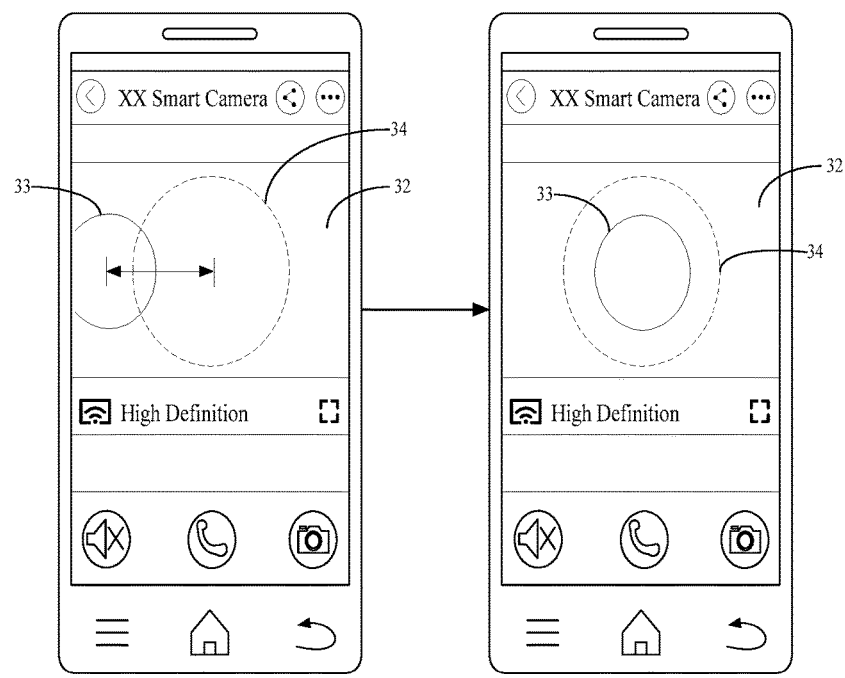
FIG. 3C is a schematic diagram showing how to adjust a position of a human face according to an exemplary embodiment.

Refer to FIG. 3C, which is a schematic diagram showing how to adjust a position of a human face. In FIG. 3C, when it is detected that the distance from the center of the video picture 32 to the center of the image 33 of the human face is greater than the preset distance (for example, the center of the image 33 of the human face is located outside the circle 34 whose center is the center of the video picture 32 and whose radius is the preset distance), the shooting angle of the camera is fine-adjusted such that the image 33 of the human face is located at the center of the video picture 32 once again.

For example, the shooting angle of the camera is not adjusted immediately when the camera detects that the distance from the center of the video picture to the center of the image of the human face is greater than the preset distance, but is adjusted after a preset period of time (which may be 5 or 10 s for example). The camera fine-adjusts the shooting angle based on the position of the image of the human face, only when the distance from the center of the video picture to the center of the image at the position of the human face is greater than the preset distance for a duration longer than the preset period of time.

It should be noted that the detection of the distance by which the image of the human face deviates from the center of the video picture and the preset distance are not defined by the embodiment but may be set by developers or users according to the actual needs.

To sum up, in the camera shooting angle adjusting method according to the embodiment of the disclosure, a position of a human body in a shooting range of a camera is determined, a shooting angle of the camera is adjusted so that the camera targets the position of the human body, and then the camera is fine-adjusted based on a position of a human face. As such, the shooting angle of the camera is automatically fine-adjusted based on the position of the human face, without the need for users to manually adjust the shooting angle of the camera, thereby reducing the complexity of users' operations and improving the accuracy of adjusting the shooting angle.

In the disclosure, by using a sound source or infrared signal detecting method, a sound signal or an infrared signal sent by a human body in a shooting range is collected, and a position of the human body in the shooting range can be determined based on a preset frequency band or time-frequency spectrum, so that the human body in the shooting range can be tracked accurately and effectively. Accordingly, a shooting angle of a camera can be adjusted to adapt to the position of the human body, and it can be avoided that the position of an animal or object other than a human body is determined as the position of the human body.

Here, by recognizing a facial expression in the shooting range, a human face to be shot by the camera can be determined. Alternatively, the camera pushes a shot video picture to a user terminal connected to the camera; and by receiving the user terminal's selection instruction information, a human face to be shot can be determined. Accordingly, a shooting angle can be fine-adjusted. As such, it is convenient, when there are multiple human faces in the shooting range, to adjust the shooting angle of the camera based on the user's needs, so that the human face to be shot can be displayed at the center of the video picture.

In addition, a distance between the center of the video picture and an image of the human face is determined and, when the distance between the center of the video picture and the image of the human face is greater than a preset distance, the shooting angle of the camera is fine-adjusted such that the image of the human face is located at the center of the video picture, thereby achieving the best shooting effect.

The followings describe apparatus embodiments of the present disclosure, which may be used to perform the method embodiments of the present disclosure. For the details not disclosed in the apparatus embodiments of the present disclosure, please refer to the method embodiments of the present disclosure.

Figure 4:
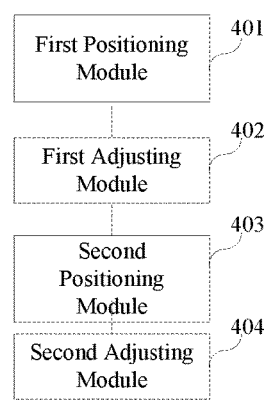
FIG. 4 is a block diagram illustrating a camera shooting angle adjusting apparatus according to an exemplary embodiment.

FIG. 4 is a schematic diagram illustrating a camera shooting angle adjusting apparatus according to an exemplary embodiment. The apparatus may be used in a camera. Referring to FIG. 4, the apparatus includes but is not limited to include a first positioning module 401, a first adjusting module 402, a second positioning module 403 and a second adjusting module 404.

The first positioning module 401 is configured to determine a position of a human body in a shooting range of a camera.

The first adjusting module 402 is configured to adjust a shooting angle of the camera based on the position of the human body determined by the first positioning module 401, such that an image of the human body is located at the center of a video picture shot by the camera.

The second positioning module 403 is configured to determine a position of a human face in the video picture shot by the camera.

The second adjusting module 404 is configured to fine-adjust the shooting angle of the camera based on the position of the human face determined by the second positioning module 403, such that an image of the human face is located at the center of the video picture shot by the camera.

To sum up, in the camera shooting angle adjusting apparatus according to the embodiment of the disclosure, a position of a human body in a shooting range of a camera is determined, a shooting angle of the camera is adjusted so that the camera targets the position of the human body, and then the camera is fine-adjusted based on a position of a human face. As such, the shooting angle of the camera is automatically fine-adjusted based on the position of the human face, without the need for users to manually adjust the shooting angle of the camera, thereby reducing the complexity of users' operations and improving the accuracy of adjusting the shooting angle.

Figure 5:
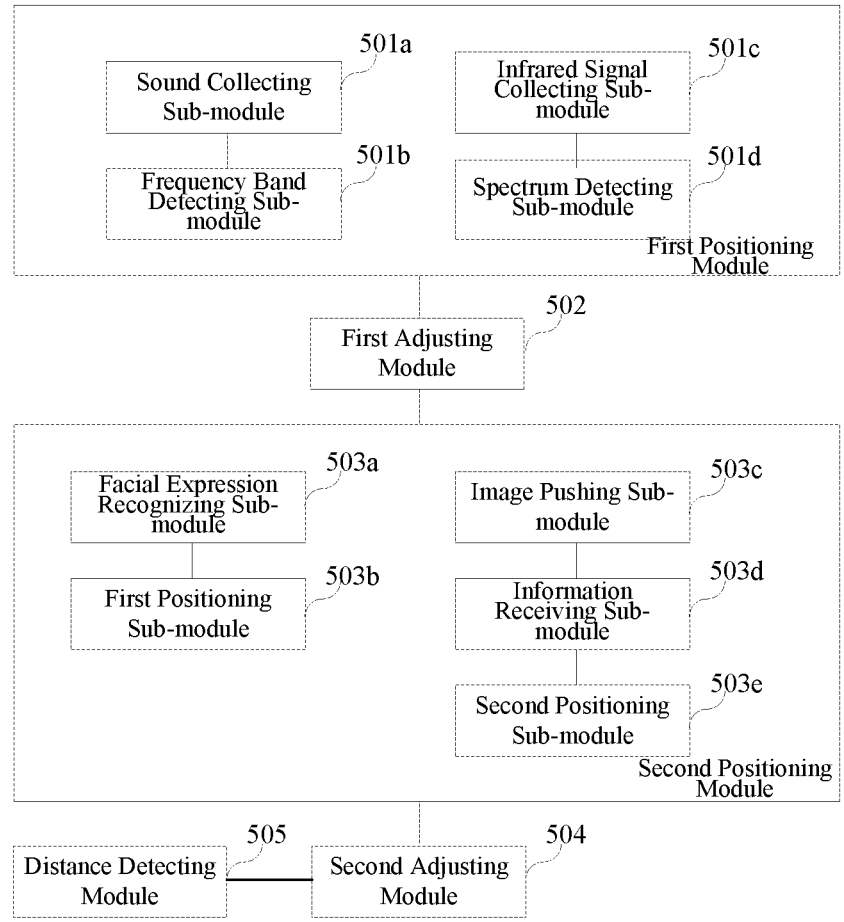
FIG. 5 is a block diagram illustrating a camera shooting angle adjusting apparatus according to another exemplary embodiment.

FIG. 5 is a schematic diagram illustrating a camera shooting angle adjusting apparatus according to another exemplary embodiment. The apparatus may be used in a camera. Referring to FIG. 5, the apparatus includes but is not limited to include a first positioning module 501, a first adjusting module 502, a second positioning module 503 and a second adjusting module 504.

The first positioning module 501 is configured to determine a position of a human body in a shooting range of a camera.

The first adjusting module 502 is configured to adjust a shooting angle of the camera based on the position of the human body determined by the first positioning module 501, such that an image of the human body is located at the center of a video picture shot by the camera.

The second positioning module 503 is configured to determine a position of a human face in the video picture shot by the camera.

The second adjusting module 504 is configured to fine-adjust the shooting angle of the camera based on the position of the human face determined by the second positioning module 503, such that an image of the human face is located at the center of the video picture shot by the camera.

Alternatively or additionally, the first positioning module 501 includes a sound collecting sub-module 501a and a frequency band detecting sub-module 501b.

The sound collecting sub-module 501a is configured to collect a sound signal sent from a sound source in the shooting range of the camera.

The frequency band detecting sub-module 501b is configured to detect whether a frequency band of the sound signal collected by the sound collecting sub-module 501a is within a preset frequency band.

A position of the sound source is determined as the position of the human body, when the frequency band of the sound signal collected by the sound collecting sub-module 501a is within the preset frequency band.

Alternatively or additionally, the first positioning module 501 further includes an infrared signal collecting sub-module 501c and a spectrum detecting sub-module 501d.

The infrared signal collecting sub-module 501c is configured to collect an infrared signal sent by an infrared signal source in the shooting range of the camera.

The spectrum detecting sub-module 501d is configured to detect whether the spectrum feature of the infrared signal collected by the infrared signal collecting sub-module 501c matches a preset spectrum.

A position of the infrared signal source is determined as the position of the human body, when the spectrum feature of the infrared signal collected by the infrared signal collecting sub-module 501c matches the preset spectrum.

Alternatively or additionally, the second positioning module 503 includes a facial expression recognizing sub-module 503a and a first positioning sub-module 503b.

The facial expression recognizing sub-module 503a is configured to recognize a facial expression of at least one human face in the video picture shot by the camera.

The first positioning sub-module 503b is configured to determine a position of a human face, whose facial expression recognized by the facial expression recognizing sub-module 503a matches a designated facial expression, in the video picture as the position of the human face.

Alternatively or additionally, the second positioning module 503 further includes an image pushing sub-module 503c, an information receiving sub-module 503d and a second positioning sub-module 503e.

The image pushing sub-module 503c is configured to push the video picture to a user terminal connected to the camera.

The information receiving sub-module 503d is configured to receive selection instruction information returned by the user terminal, the selection instruction information indicating a human face included in the video picture.

The second positioning sub-module 503e is configured to determine a position of the human face indicated by the selection instruction information received by the information receiving sub-module 503d in the video picture as the position of the human face.

Alternatively or additionally, the apparatus further includes a distance detecting module 505.

The distance detecting module 505 is configured to, after the shooting angle of the camera is fine-adjusted based on the position of the human face, detect a distance by which the image of the human face deviates from the center of the video picture shot by the camera.

The second adjusting module 504 is further configured to, when it is detected that the distance by which the center of the image at the position of the human face deviates from the center of the video picture, detected by the distance detecting module 505, is greater than a preset distance, fine-adjust the shooting angle of the camera based on the position of the image of the human face once again, such that the image of the human face is located at the center of the video picture shot by the camera.

To sum up, in the camera shooting angle adjusting apparatus according to the embodiment of the disclosure, a position of a human body in a shooting range of a camera is determined, a shooting angle of the camera is adjusted so that the camera targets the position of the human body, and then the camera is fine-adjusted based on a position of a human face. As such, the shooting angle of the camera is automatically fine-adjusted based on the position of the human face, without the need for users to manually adjust the shooting angle of the camera, thereby reducing the complexity of users' operations and improving the accuracy of adjusting the shooting angle.

In the disclosure, by using a sound source or infrared signal detecting method, a sound signal or an infrared signal sent by a human body in a shooting range is collected, and a position of the human body in the shooting range can be determined based on a preset frequency band or time-frequency spectrum, so that the human body in the shooting range can be tracked accurately and effectively. Accordingly, a shooting angle of a camera can be adjusted to adapt to the position of the human body, and it can be avoided that the position of an animal or object other than a human body is determined as the position of the human body.

Here, by recognizing a facial expression in the shooting range, a human face to be shot by the camera can be determined. Alternatively, the camera pushes a shot video picture to a user terminal connected to the camera; and by receiving the user terminal's selection instruction information, a human face to be shot can be determined. Accordingly, a shooting angle can be fine-adjusted. As such, it is convenient, when there are multiple human faces in the shooting range, to adjust the shooting angle of the camera based on the user's needs, so that the human face to be shot can be displayed at the center of the video picture.

In addition, a distance between the center of the video picture and an image of the human face is determined and, when the distance between the center of the video picture and the image of the human face is greater than a preset distance, the shooting angle of the camera is fine-adjusted such that the image of the human face is located at the center of the video picture, thereby achieving the best shooting effect.

A camera shooting angle adjusting apparatus is provided according to yet another exemplary embodiment of the present disclosure. The apparatus can realize the camera shooting angle adjusting method of the present disclosure, and includes a processor and a memory configured to store instructions executable by the processor.

The processor is configured to: determine a position of a human body in a shooting range of a camera; adjust a shooting angle of the camera based on the position of the human body, such that an image of the human body is located at the center of a video picture shot by the camera; determine a position of a human face in the video picture shot by the camera; and fine-adjust the shooting angle of the camera based on the position of the human face, such that an image of the human face is located at the center of the video picture shot by the camera.

Alternatively or additionally, said determining the position of the human body in the shooting range of the camera includes: collecting a sound signal sent from a sound source in the shooting range of the camera; detecting whether a frequency band of the sound signal is within a preset frequency band; and determining a position of the sound source as the position of the human body when the frequency band of the sound signal is within the preset frequency band.

Alternatively or additionally, said determining the position of the human body in the shooting range of the camera includes: collecting an infrared signal sent by an infrared signal source in the shooting range of the camera; detecting whether the spectrum feature of the infrared signal matches a preset spectrum; and determining a position of the infrared signal source as the position of the human body when the spectrum feature of the infrared signal matches the preset spectrum.

Alternatively or additionally, said determining the position of the human face in the video picture shot by the camera includes: recognizing a facial expression of at least one human face in the video picture shot by the camera; and determining a position of a human face, whose facial expression matches a designated facial expression, in the video picture as the position of the human face.

Alternatively or additionally, said determining the position of the human face in the video picture shot by the camera includes: pushing the video picture to a user terminal connected to the camera; receiving selection instruction information returned by the user terminal, the selection instruction information indicating a human face included in the video picture; and determining a position of the human face indicated by the selection instruction information in the video picture as the position of the human face.

Alternatively or additionally, the processor is further configured to: after fine-adjusting the shooting angle of the camera based on the position of the human face, detect a distance by which the image of the human face deviates from the center of the video picture shot by the camera; when detecting that the distance by which the image of the human face deviates from the center of the video picture is greater than a preset distance, fine-adjust the shooting angle of the camera based on the position of the image of the human face such that the image of the human face is located at the center of the video picture shot by the camera.

Figure 6:
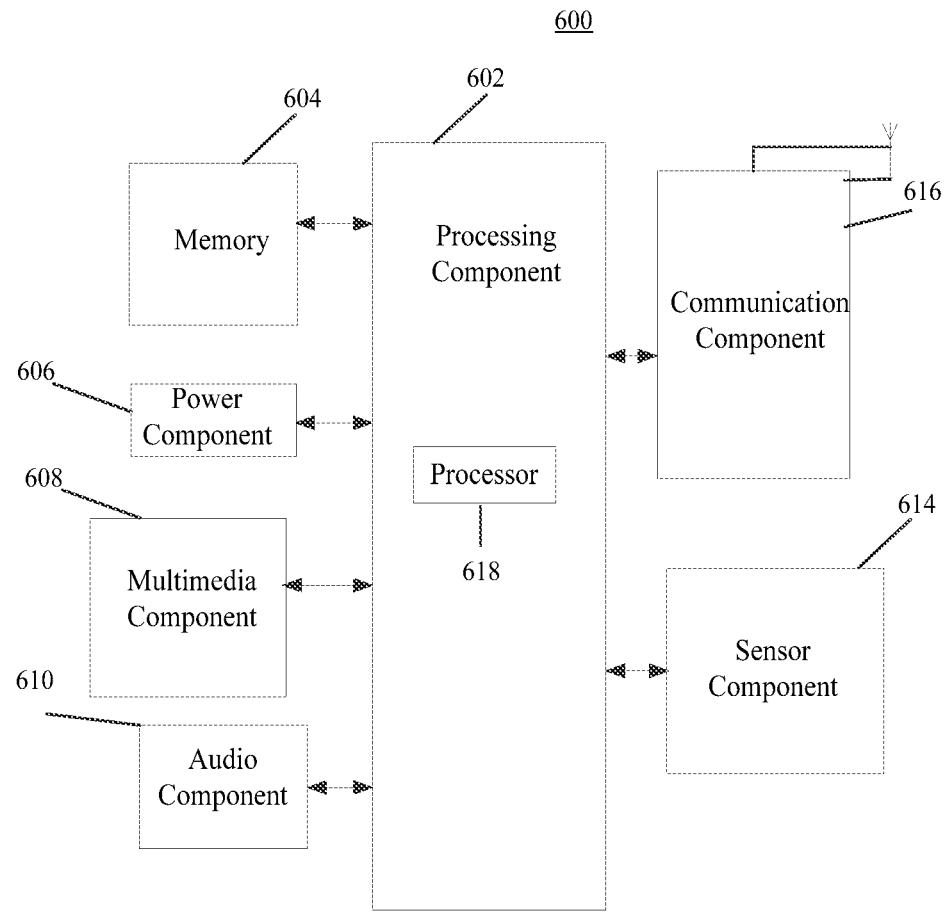
FIG. 6 is a block diagram illustrating a camera shooting angle adjusting apparatus according to yet another exemplary embodiment.

FIG. 6 is a schematic diagram illustrating a camera shooting angle adjusting apparatus 600 according to yet another exemplary embodiment. For example, the apparatus 600 may be a camera.

Referring to FIG. 6, the apparatus 600 may include one or more following components: a processing component 602, a memory 604, a power component 606, a multimedia component 608, an audio component 610, a sensor component 614 and a communication component 616.

The processing component 602 typically controls overall operations of the apparatus 600, such as the operations associated with display, telephone calls, data communications, camera operations and recording operations. The processing component 602 may include one or more processors 618 to execute instructions to perform all or part of the steps in the above described methods. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, video, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. The memory 604 also stores one or more modules configured to, when being executed by the one or more processors 618, perform all or a part of the steps of the method shown in FIG. 1, 2A or 3A.

The power component 606 provides power to various components of the apparatus 600. The power component 606 may include a power management system, one or more power sources, and any other components associated with the generation, management, and distribution of power in the apparatus 600.

The multimedia component 608 includes a screen providing an output interface between the apparatus 600 and the user. In some embodiments, the screen may include a liquid crystal display (LCD) and a touch panel (TP). When the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive an external multimedia datum while the apparatus 600 is in an operation mode, such as a photographing mode or a video mode. Each of the front and rear cameras may be a fixed optical lens system or have a focus and optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The sensor component 614 includes one or more sensors to provide status assessments of various aspects of the apparatus 600. For instance, the sensor component 614 may detect an open/closed status of the apparatus 600, relative positioning of components, e.g., the display and the keypad, of the apparatus 600, a change in position of the apparatus 600 or a component of the apparatus 600, a presence or absence of user's contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor or a temperature sensor.

The communication component 616 is configured to facilitate communication, wired or wirelessly, between the apparatus 600 and other devices. The apparatus 600 can access a wireless network based on a communication standard, such as WiFi, 2G; or 3G or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications.

In exemplary embodiments, the apparatus 600 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit in the disclosure may be implemented at least partially using the one or more circuitries.

In exemplary embodiments, there is also provided a non-transitory computer-readable storage medium including instructions, such as included in the memory 604, executable by the processor 618 in the apparatus 600, for performing the above-described methods. For example, the non-transitory computer-readable storage medium may be a ROM, a RAM, a CD-ROM, a magnetic tape, a floppy disc, an optical data storage device, and the like.

Regarding the apparatuses in the above embodiments, the specific manners for respective modules to perform operations have been described in detail in the method embodiments, and will not be elaborated herein.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for adjusting camera shooting angle, comprising:
    determining a position of a human body in a shooting range of a camera;
    adjusting, by a camera motor, a shooting angle of the camera based on the position of the human body wherein the shooting angle of the camera is adjusted automatically to target the position of the human body, such that an image of the human body is located at the center of a video picture shot by the camera;
    determining a position of a human face in the video picture shot by the camera; and
    fine-adjusting, by the camera motor, the shooting angle of the camera based on the position of the human face, such that an image of the human face is located at the center of the video picture shot by the camera;
    wherein determining the position of the human body in the shooting range of the camera comprises:
        collecting an infrared signal sent by an infrared signal source in the shooting range of the camera;
        detecting whether a spectrum feature of the infrared signal matches a preset spectrum; and
        determining a position of the infrared signal source as the position of the human body when the spectrum feature of the infrared signal matches the preset spectrum.

2. The method of claim 1, wherein determining the position of the human body in the shooting range of the camera further comprises:
    collecting a sound signal sent from a sound source in the shooting range of the camera;
    detecting whether a frequency band of the sound signal is within a preset frequency band; and
    determining a position of the sound source as the position of the human body, when the frequency band of the sound signal is within the preset frequency band.

3. The method of claim 1, wherein determining the position of the human face in the video picture shot by the camera comprises:
    recognizing a facial expression of at least one human face in the video picture shot by the camera; and
    determining a position of a human face, whose facial expression matches a designated facial expression, in the video picture as the position of the human face.

4. The method of claim 1, wherein determining the position of the human face in the video picture shot by the camera comprises:
    pushing the video picture to a user terminal connected to the camera;
    receiving a selection instruction returned by the user terminal, the selection instruction indicating a human face included in the video picture; and
    determining a position of the human face indicated by the selection instruction in the video picture as the position of the human face.

5. The method of claim 1, further comprising:
    after fine-adjusting the shooting angle of the camera based on the position of the human face, detecting a distance by which the image of the human face deviates from the center of the video picture shot by the camera;
    when detecting that the distance by which the image of the human face deviates from the center of the video picture is greater than a preset distance, fine-adjusting, by the camera motor, the shooting angle of the camera based on the position of the image of the human face once again, such that the image of the human face is located at the center of the video picture shot by the camera.

6. An apparatus, comprising:
    a processor; and
    a memory configured to store instructions executable by the processor,
    wherein the processor is configured to:
    determine a position of a human body in a shooting range of a camera;
    adjust, by a camera motor, a shooting angle of the camera based on the position of the human body wherein the shooting angle of the camera is adjusted automatically to target the position of the human body, such that an image of the human body is located at the center of a video picture shot by the camera;
    determine a position of a human face in the video picture shot by the camera; and
    fine-adjust, by the camera motor, the shooting angle of the camera based on the position of the human face, such that an image of the human face is located at the center of the video picture shot by the camera;
    wherein determining the position of the human body in the shooting range of the camera comprises:
        collecting an infrared signal sent by an infrared signal source in the shooting range of the camera;
        detecting whether a spectrum feature of the infrared signal matches a preset spectrum; and
        determining a position of the infrared signal source as the position of the human body when the spectrum feature of the infrared signal matches the preset spectrum.

7. The apparatus of claim 6, wherein the processor is further configured to:
- collect a sound signal sent from a sound source in the shooting range of the camera;
- detect whether a frequency band of the sound signal is within a preset frequency band; and
- determine a position of the sound source as the position of the human body, when the frequency band of the sound signal is within the preset frequency band.

8. The apparatus of claim 6, wherein the processor is further configured to:
- recognize a facial expression of at least one human face in the video picture shot by the camera; and
- determine a position of a human face, whose facial expression matches a designated facial expression, in the video picture as the position of the human face.

9. The apparatus of claim 6, wherein the processor is further configured to:
- push the video picture to a user terminal connected to the camera;
- receive a selection instruction returned by the user terminal, the selection instruction indicating a human face included in the video picture; and
- determine a position of the human face indicated by the selection instruction in the video picture as the position of the human face.

10. The apparatus of claim 6, wherein the processor is further configured to:
- after fine-adjusting the shooting angle of the camera based on the position of the human face, detect a distance by which the image of the human face deviates from the center of the video picture shot by the camera;
- when detecting that the distance by which the image of the human face deviates from the center of the video picture is greater than a preset distance, fine-adjust, by the camera motor, the shooting angle of the camera based on the position of the image of the human face once again, such that the image of the human face is located at the center of the video picture shot by the camera.

11. A non-transitory computer-readable storage medium having stored therein instructions that, when executed by a processor of a mobile terminal, causes the mobile terminal to perform acts comprising:
- determining a position of a human body in a shooting range of a camera;
- adjusting, by a camera motor, a shooting angle of the camera based on the position of the human body wherein the shooting angle of the camera is adjusted automatically to target the position of the human body, such that an image of the human body is located at the center of a video picture shot by the camera;
- determining a position of a human face in the video picture shot by the camera; and
- fine-adjusting, by the camera motor, the shooting angle of the camera based on the position of the human face, such that an image of the human face is located at the center of the video picture shot by the camera;

wherein determining the position of the human body in the shooting range of the camera comprises:
- collecting an infrared signal sent by an infrared signal source in the shooting range of the camera;
- detecting whether a spectrum feature of the infrared signal matches a preset spectrum; and
- determining a position of the infrared signal source as the position of the human body when the spectrum feature of the infrared signal matches the preset spectrum.

12. The storage medium of claim 11, wherein determining the position of the human body in the shooting range of the camera further comprises:
- collecting a sound signal sent from a sound source in the shooting range of the camera;
- detecting whether a frequency band of the sound signal is within a preset frequency band; and
- determining a position of the sound source as the position of the human body, when the frequency band of the sound signal is within the preset frequency band.

13. The storage medium of claim 11, wherein determining the position of the human face in the video picture shot by the camera comprises:
- recognizing a facial expression of at least one human face in the video picture shot by the camera; and
- determining a position of a human face, whose facial expression matches a designated facial expression, in the video picture as the position of the human face.

14. The storage medium of claim 11, wherein determining the position of the human face in the video picture shot by the camera comprises:
- pushing the video picture to a user terminal connected to the camera;
- receiving a selection instruction returned by the user terminal, the selection instruction indicating a human face included in the video picture; and
- determining a position of the human face indicated by the selection instruction in the video picture as the position of the human face.

15. The storage medium of claim 11, wherein the acts further comprise:
- after fine-adjusting the shooting angle of the camera based on the position of the human face, detecting a distance by which the image of the human face deviates from the center of the video picture shot by the camera;
- when detecting that the distance by which the image of the human face deviates from the center of the video picture is greater than a preset distance, fine-adjusting, by the camera motor, the shooting angle of the camera based on the position of the image of the human face once again, such that the image of the human face is located at the center of the video picture shot by the camera.

* * * * *